United States Patent [19]

Barney

[11] 4,201,223
[45] May 6, 1980

[54] INTERNAL BODY ORGAN MOTION PICTURE SYNTHESIZING APPARATUS

[75] Inventor: Howard H. Barney, Los Altos Hills, Calif.

[73] Assignee: Dunn Instruments, Inc., San Francisco, Calif.

[21] Appl. No.: 808,340

[22] Filed: Jun. 20, 1977

[51] Int. Cl.² ............................................. A61B 1/04
[52] U.S. Cl. ............................................... 128/653
[58] Field of Search ........... 128/2 A, 2 R, 2 S, 2.05 R, 128/2.06 R, 4, 6, 2.05 Q; 346/33 ME

[56] References Cited

U.S. PATENT DOCUMENTS

| | | | |
|---|---|---|---|
| 2,193,471 | 3/1940 | Both | 128/2.06 G |
| 3,020,119 | 2/1962 | Marchal et al. | 128/2.05 R |
| 3,542,012 | 11/1970 | Freiberger | 128/2.05 R |
| 3,605,724 | 9/1971 | Flaherty | 128/2.06 R |

Primary Examiner—William E. Kamm
Attorney, Agent, or Firm—Schapp and Hatch

[57] ABSTRACT

Apparatus for synthesizing motion pictures of a cyclically functioning internal body organ such as a human heart from the monitor control (X, Y, and Z) signals provided by a scintillation camera excited by radiation from a bolus of radiopharmaceutical material transiting or standing in the organ. The individual frames of the synthesized motion picture are recorded on a disc of photographic film which is rotated step-by-step by a digital rate-and-position servodrive. The picture quality of each frame is enhanced by repeatedly exposing it to the monitor screen image during substantially the same phase of successive functioning cycles of the organ. The organ cycle phase signals which serve as step commands for the servodrive are generated by a synchronizing circuit which is itself synchronized to the cyclic rate of the body organ being examined by means of bioelectrical signals derived from the patient being examined. A light source, optics, and a viewing screen are provided for making use of the film disc drive in projecting the synthesized motion pictures from developed film discs.

8 Claims, 6 Drawing Figures

INTERNAL BODY ORGAN MOTION PICTURE SYNTHESIZING APPARATUS

BACKGROUND OF THE INVENTION

1. Field of the Invention

The present invention relates to apparatus for synthesizing motion pictures of cyclically functioning internal body organs from the monitor control signals provided by a scintillation camera excited by radiation from a bolus of radiopharmaceutical material transiting or standing in the organ being examined, and more particularly to apparatus for recording such synthesized internal body organ motion pictures in a closed, repeatedly scanned array on a disc or closed loop of photographic film and for presenting such synthesized motion pictures of cyclically functioning internal body organs on a viewing screen.

2. Description of the Prior Art

Scintillation cameras for use in producing rudimentary pictorial representations of internal body organs on a suitable monitor when excited by radiopharmaceutical materials translating or standing in such organs are well-known in the prior art. Such prior art scintillation cameras in general produce electrical monitor control signals in X, Y, Z format, which can be used to excite a suitable monitor to display said rudimentary pictorial representations. Automatically operated cameras, or imagers, for photographically recording a plurality of said rudimentary pictorial representations in sequence in a predetermined parallel linear array on a single piece of cut film are also well-known in the prior art. The prior art also teaches that in a scintillation camera-imager combination stepping signal generating means may be provided to repeatedly trigger the imager circuit and thus move the rudimentary pictorial representation forward from position to position on the monitor screen circuit during a functioning cycle of the internal body organ being examined, thereby producing a series of photographs of predetermined phases of the functioning of the internal body organ being examined arranged in a parallel linear, left-to-right array on a single piece of photographic film. The operation of this prior art stepping signal generating means is synchronized with the cyclical functioning of the internal body organ being examined by means of bioelectrical signals derived from the patient being examined. It is also taught in the prior art that the quality of the rudimentary pictorial representations thus photographically recorded may be enhanced by reexposing the same areas of the same sheet of cut film to the monitor display during their corresponding phases of many successive functioning cycles of the same internal body organ. It has also been suggested in the prior art that these synthetically enhanced series of pictorial representations of successive phases of the cyclical functioning of an internal body organ be assembled by manual "cut-and-paste" methods into a continuous loop of film wherefrom a motion picture of the internal body organ can be projected. This manual method of synthesizing motion pictures of internal body organs is not believed to have been used, because of the inordinately high labor costs involved, and also because of the practical difficulties involved in thus producing a film loop in which each frame is perfectly registered with every other frame and also with the sprocket holes, or the like. Further, the usefulness of the prior art method of employing a scintillation camera and a parallel linear array imager triggered by bioelectrical signals to produce phase photographs of cyclically functioning organs is seriously limited by the great loss of resolution resulting from reducing display picture size to allow the display of, say, 16 pictures on a single monitor display screen.

SUMMARY OF THE INVENTION

Accordingly, it is an object of the present invention to provide apparatus for synthesizing motion pictures of a cyclically functioning internal body organ, such as a human heart, from monitor signals provided by a scintillation camera.

It is another object of the present invention to provide apparatus for thus synthesizing motion pictures of a cyclically functioning internal body organ wherein each motion picture frame is derived from exposures of substantially the entire useful area of the monitor screen, thereby achieving substantially greater resolution than is found in the parallel linear array organ cycle phase photographs of the prior art.

It is yet another object of the present invention to produce from monitor signals provided by a scintillation camera directly synthesized motion pictures of a cyclically functioning internal body organ, i.e., motion pictures made without manual "cut-and-paste" operations or the like.

It is a further object of the present invention to provide apparatus for synthesizing motion pictures of a cyclically functioning internal body organ from monitor signals provided by a scintillation camera which apparatus is synchronized to the cyclical functioning of the body organ by bioelectrical signals derived from the patient whose organ is being examined, and which apparatus automatically analyzes those bioelectrical signals and warns the operator if those bioelectrical signals are initially or later become insufficient in quality to properly operate the apparatus, thereby permitting the operator to reposition the pickup electrodes to improve the quality of the signals.

A yet further object of the present invention is to provide in such apparatus means for detecting anomalous bioelectrical signals (such as those resulting from premature ventricular contractions when a human heart is being examined), interrupting the photographic recording operation for a predetermined number of organ cycles when such an anomalous signal (deviating from the normal beyond certain predetermined limits) is detected, testing the bioelectrical signal after the passage of said predetermined number of organ cycles to determine whether the anomaly is still present, and automatically resuming the photographic recording process if the anomaly is no longer present.

It is yet another object of the present invention to provide in such apparatus means for resynchronizing the film advance rate with the cyclic rate of the organ being examined after the occurrence of a bioelectrical signal anamaly, and the concomitant temporary interruption of the photographic recording process, if the cyclic rate of the organ has changed during the existence of the anomaly.

It is an additional object of the present invention to provide in such apparatus means whereby the frame advance interval during any particular organ cycle is determined in accordance with the average cyclic rate of the organ being examined over N previous cycles, rather than being fixed in duration.

It is a further object of the present invention to provide in such apparatus means whereby the frame advance interval is varied in accordance with the average over N organ cycles of the interval between two features of each cycle of said bioelectrical signal.

It is a further object of the present invention to provide such motion pictures on discs of film which can be developed in standard automatic cut film-developing apparatus.

In accordance with a principal aspect of the present invention, internal body organ motion picture synthesizing apparatus is provided which comprises film moving means for so intermittently moving a piece of photographic film as to serially present a plurality of areas thereof for exposure, and synchronizing means for synchronizing the presentation of each of said areas for exposure with the occurrence of a corresponding phase of successive cycles of a cyclically functioning internal body organ.

In accordance with a further principal feature of the present invention, said piece of photographic film is a disc of photographic film, and said areas are distributed in seriatim concatenation about the axis of symmetry perpendicular to the plane of said disc.

In accordance with another feature of the present invention, and synchronizing means is suitable for synchronizing the photographic operations of a conventional parallel linear array imager with particular phases of the functioning cycles of cyclically functioning internal body organs, and may be commercially provided as a separate unit for that purpose.

In accordance with another aspect of the present invention, said synchronizing means further comprises means for interrupting the exposure of said areas for a predetermined number of organ cycles whenever an anomalous bioelectrical signal exceeding certain predetermined permissible signal quality limits is received from the patient whose organ is being examined.

In accordance with a further aspect of the present invention, said synthesizing apparatus is further provided with projecting means juxtaposed to the film transport means for projecting images of developed films onto a viewing screen when a developed film is transported by the film transport means.

In accordance with another aspect of the present invention, said synthesizing apparatus is provided with means for storing signals representing the duration of each of a predetermined plurality of prior organ cycles, means for determining the average duration of said prior organ cycles, and means for varying the frame advance interval from organ cycle to organ cycle in accordance with the value of said average duration at the commencement of each organ cycle.

In accordance with yet another aspect of the present invention, said synthesizing apparatus comprises means for determining the duration of the intervals between the occurrence of two characteristic features of each organ cycle, means for taking the average of said interval durations over a predetermined number of previous organ cycles, and means for varying the frame advance interval from organ cycle to organ cycle in accordance with the value of said average at the commencement of each organ cycle.

Other objects and aspects of the present invention will in part be obvious and will in part appear hereinafter.

The present invention, accordingly, comprises the features of construction, combinations of elements, and arrangements of parts which will be exemplified in the construction hereinafter set forth, and the scope of the invention will be indicated in the appended claims.

For a fuller understanding of the nature and objects of the present invention, reference should be had to the following detailed description, taken in connection with the accompanying drawings.

DESCRIPTION OF THE PREFERRED EMBODIMENT

Figure 1:
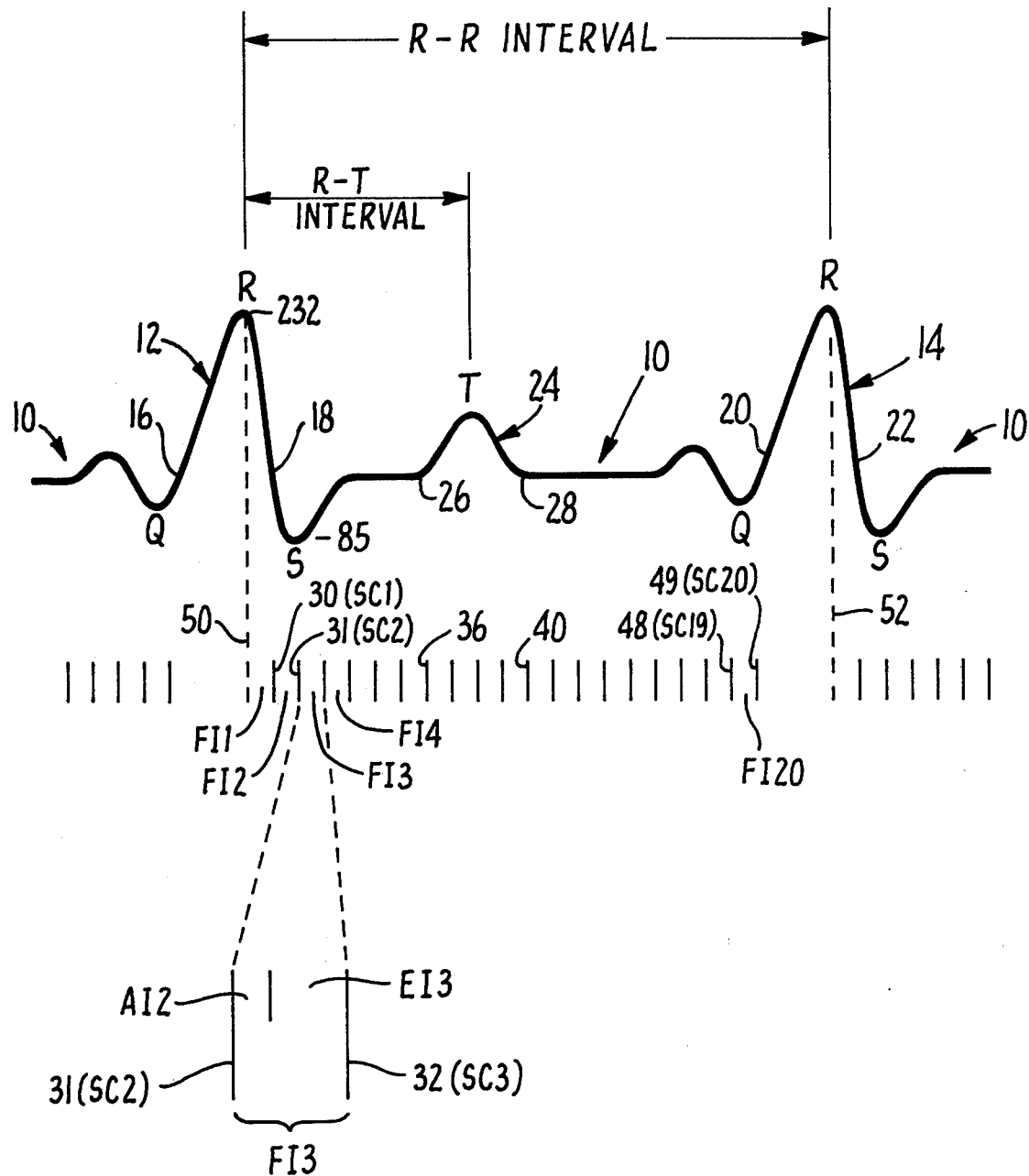
FIG. 1 is an idealized representation of the type of bioelectrical signal well-known as an ECG signal.

Referring now to FIG. 1, there is shown an idealized representation 10 of the type of bioelectrical signal well-known to cardiologists as an ECG signal, such as might be seen displayed on the display screen on an ECG monitor. As is well-known to those having ordinary skill in the art, such ECG signals vary widely in contour and amplitude, not only from patient to patient but also with variations in electrocardiograph pickup electrode placement.

In general, however, electrocardiograph or ECG signals manifest the characteristic feature called "R-waves" in the medical literature, i.e., upwardly projecting, maximum amplitude peaks such as the peaks identified by the reference numerals 12 and 14 in FIG. 1. (In accordance with well-established practice, ECG waves are generally shown in the literature and displayed on ECG monitor display screens with the R-waves directed upwardly.)

In conformance with well-established practice, the expression "R-waves" will be used herein to denote such major upwardly directed peaks of ECG signals. It is to be kept in mind, however, that the term "R-waves" used herein does not refer to continuous waves or signals but rather to parts of ECG signals. For example, the first R-wave shown in FIG. 1 extends from point 16 to point 18, and the second R-wave shown in FIG. 1 extends from point 20 to point 22. The wave segment 18-20 of FIG. 1 is not part of an R-wave, nor are the parts of the ECG signal of FIG. 1 preceding point 16 and following point 22.

Another feature of each cycle of the ECG signal wave is the "T-wave", indicated in FIG. 1 by the reference numeral 24. In conformance with well-established practice, the expression "T-wave" as used herein does not refer to continuous waves or signals but rather to particular parts of ECG signal waves. For example, the T-wave shown in FIG. 1 extends only from point 26 to point 28. Neither the portion of ECG signal 10 to the left of point 26 in FIG. 1, nor the portion of ECG signal 10 to the right of point 28 in FIG. 1, is part of T-wave 24.

As further shown in FIG. 1, the expression "R-R interval" is used herein to denote the time interval between the peaks of two successive R-waves, i.e., the duration of a single cycle of ECG signal 10. As is well-known to those having ordinary skill in the art, the R-R interval varies widely in duration, not only from patient to patient but also with the age of the patient and the current physical and emotional condition of the patient when the patient's heart action is being monitored, as well as with other factors.

As also shown in FIG. 1, the expression "R-T interval" is used herein to denote the interval between the peak of an R-wave and the peak of the immediately following T-wave. It has been observed that R-T intervals are frequently more stable or unvarying in duration from ECG cycle to ECG cycle than the duration of the corresponding R-R intervals. As will be explained hereinafter, one feature of the preferred embodiment of the present invention takes advantage of this relative stability of the R-T interval.

The reference numerals 30 through 49 in FIG. 1 indicate the times of occurrence of corresponding step command signals SC1 through SC20, the generation and utilization of which will be explained hereinafter.

The dashed line 50 in FIG. 1 represents the time at which R-wave 14 reaches its peak.

As also seen in FIG. 1, the interval between peak time 50 and the time 30 of the occurrence of step command 1 (SC1) is designated FI1, or frame interval 1, for reasons which will be made apparent hereinafter. Similarly, as also seen in FIG. 1, the time interval between time 30 and time 31 (i.e., between signal command 1 and signal command 2) is designated frame interval 2 or FI2, for reasons which will be made apparent hereinafter. Further, as will be apparent from FIG. 1, each interval between a step command and its immediate successor is designated by a particular frame interval member, ranging from 2 to 20. Thus, the interval between step command 2 (SC2) and step command 3 (SC3) is designated frame interval 3 or FI3, and the interval between step command 19 (SC19) and step command 20 (SC20) is designated as frame interval 20 (FI20) herein.

As will be apparent from FIG. 1, all of the frame intervals, FI2 through FI20, are of substantially equal duration. It is particularly noted, however, that frame interval 1 (FI1) is *not* substantially equal in duration to all of the other frame intervals, but rather is shorter than the other frame intervals by the duration of the relatively fixed film advance interval (AI).

Referring now to the enlarged view of frame interval 3 (FI3) shown at the bottom of FIG. 1, it will be seen that frame interval 3 is subdivided into two subintervals AI2 and EI3. Similarly, every frame interval is subdivided into two subintervals AIX and EIY, where Y is the same number as the frame interval number and X is the frame interval number diminished by 1. As will later become apparent to those having ordinary skill in the art, when further taught by the present disclosure, there are two exceptions to these subinterval designations, viz., FI1 does not include an AI interval, and AI20 immediately follows SC20, AI20 being of the same duration as all of the other AI's. For reasons which will become apparent hereinafter, the term "AI" is taken as synonymous with the expression "advance interval" herein, and the term "EI" is taken as synonymous with the expression "exposure interval" herein.

Figure 2:
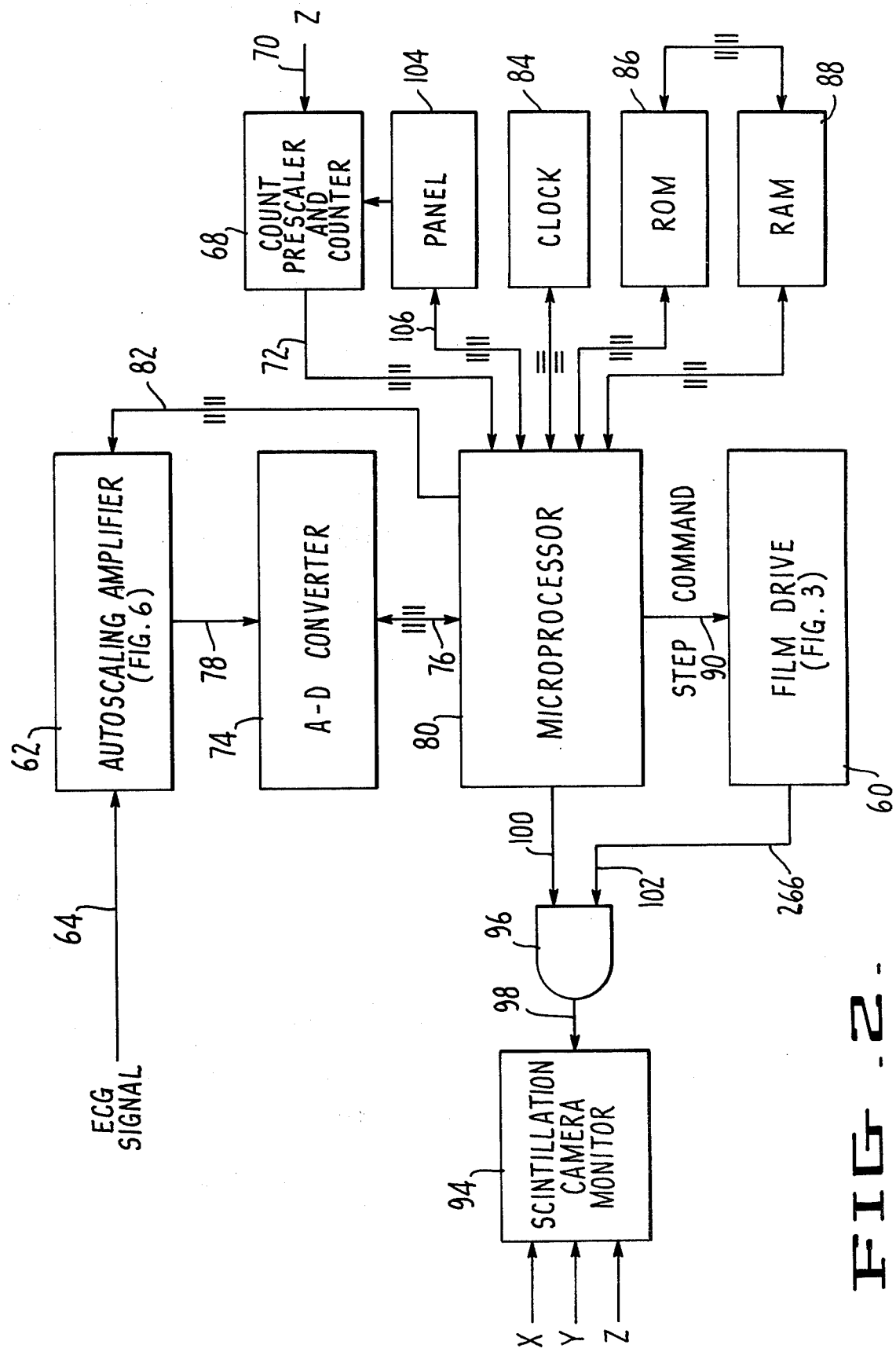
FIG. 2 is a schematic block diagram of that portion of the preferred embodiment of the present invention referred to herein as the synchronizer.

Referring now to FIG. 2, there is shown a schematic block diagram of the interval body organ motion picture synthesizing apparatus of the preferred embodiment of the present invention.

Figure 3:
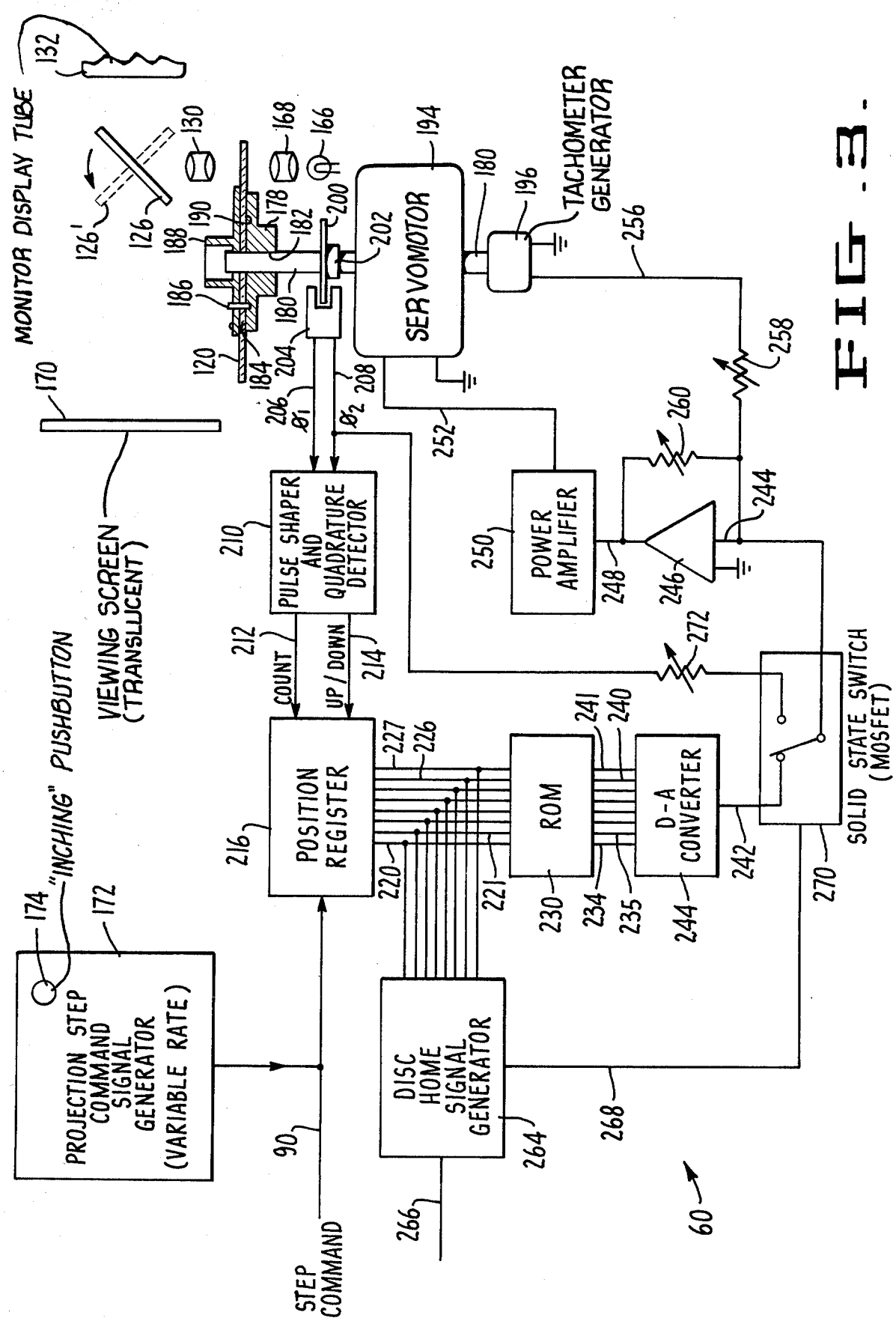
FIG. 3 is a schematic representation of the optical system of the preferred embodiment, and of the digital rate-and-position servodrive which angularly drives the film discs used in the preferred embodiment, step-by-step, from exposure position to exposure position.

As indicated in FIG. 2, the film drive 60 of the preferred embodiment is shown in detail in FIG. 3.

Figure 6:
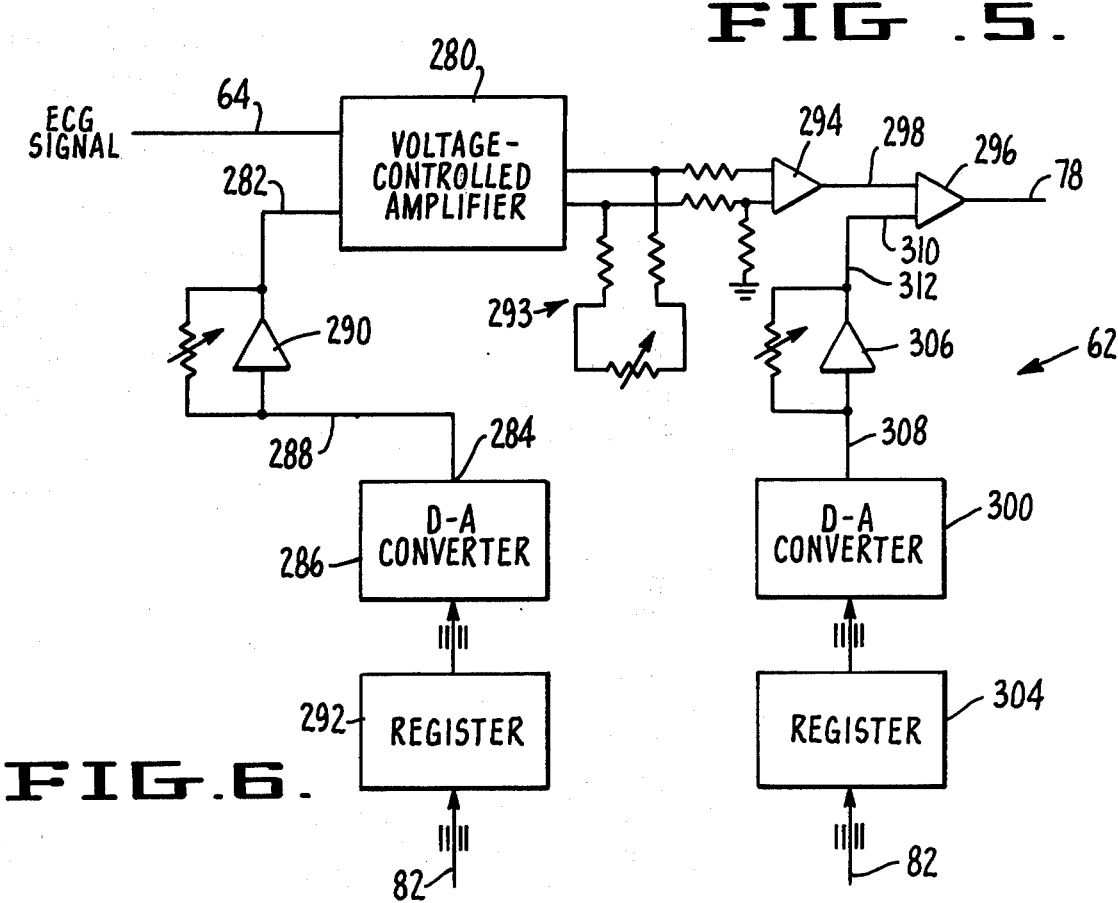
FIG. 6 is a schematic block diagram of the autoscaling amplifier of the synchronizer of FIG. 2.

As further indicated in FIG. 2, the autoscaling amplifier 62 of the preferred embodiment is shown in detail in FIG. 6.

The convention is adopted herein of indicating multiconductor interconnections by the usual interconnection indicating line having a pair of dashes set next to it on either side. Thus, the left-hand or ECG signal input connection to autoscaling amplifier 62, which is a single conductor carrying a single analog signal, is indicated by a single line unprovided with two dashes on either side thereof, whereas the right-hand input connection 66 of autoscaling amplifier 62, which is a multi-conductor interconnection carrying inter alia an eight-bit binary digital signal, is indicated by an interconnection line having a pair of dashes set on either side of it.

As indicated in FIG. 2, the preferred embodiment includes a count prescaler and counter 68. Count prescaler and counter 68 receives as its input signal on interconnection 70 the Z signal from the scintillation camera with which the synthesizer of the preferred embodiment is associated. As is well-known to those having ordinary skill in the art, a count signal is provided on the Z line whenever a scintillation is detected in the scintillation camera.

Count prescaler and counter 68 serves to accumulate a count of the Z signals occurring on interconnection 70, and to provide a multi-bit binary digital signal representing the total count divided by 1000 on multi-conductor interconnection 72.

Analog-to-digital converter 74 is an assemblage of well-known integrated circuits and other conventional circuit elements interconnected in well-known manner to sample the magnitude of the analog output voltage of autoscaling amplifier 62 appearing on interconnection 78 at the sampling rate of 500 cycles per second (Hertz) and to produce eight-bit binary digital signals on multi-conductor interconnection 76 representing the magnitudes of the successive samples. A suitable timing signal for timing this sampling process is provided by microprocessor 80 (FIG. 2) over one of the conductors of multi-conductor interconnection 76.

As also seen in FIG. 2, microprocessor 80 provides binary digital feedback signals to autoscaling amplifier 62 via multi-conductor interconnection 82. The manner in which these binary digital feedback signals are employed to normalize the ECG sample signals received by microprocessor 80 over multi-conductor interconnection 76 will be described hereinafter.

Microprocessor 80 of FIG. 2 comprises a type 8080A integrated microprocessor circuit. Clock 84 is a binary sixteen-bit integrated circuit clock of well-known type. Read-only memory unit (ROM) 86 comprises eight type 8708 integrated ROM circuits. Random access memory unit (RAM) 88 comprises eight type 2102 integrated RAM circuits.

Microprocessor 80, clock 84, ROM 86, and RAM 88 are interconnected, directly and through suitable integrated circuits in the manner well-known to those having ordinary skill in the art, for the processing of the digitized ECG sample signal date on multi-conductor interconnection 76, and the consequent production of step command signals on interconnection 90, monitor control signals on interconnection 100, and feedback signals on interconnection 82, in accordance with the program steps described hereinafter.

The scintillation camera monitor 94 shown in FIG. 2 is of a type well-known to those having ordinary skill in the art, and will not be described in detail herein.

Gate 96 is of well-known type and is so constructed and interconnected with scintillation camera monitor 94 via interconnection 98 that when either or both of its input leads 100, 102 are brought to a predetermined "beam cutoff" signal level the cathode ray beam of the display tube of scintillation camera monitor 94 is cut off and no scintillations are indicated on the display screen until the cathode ray beam is restored. The cathode ray beam is restored when and only when there is a "beam cutoff" signal on neither gate input terminal 100 nor gate input terminal 102.

As will now be understood by those having ordinary skill in the art, no mechanical shutter is employed in the motion picture synthesizing apparatus of the preferred embodiment. Rather, the exposure of the film disc employed in the preferred embodiment is controlled by alternately terminating and restoring the cathode ray beam in the cathode ray tube of scintillation camera monitor 94 by means of a suitable "beam cutoff" signal on either input terminal 100 or input terminal 102 of gate 96. The time and manner of producing these "beam cutoff" signals will be described hereinafter.

The control panel 104 of the motion picture synthesizer of the preferred embodiment is provided with suitable controls of well-known type whereby the operator may select between certain modes of operation of the motion picture synthesizer of the preferred embodiment and cause the results of certain heart parameter calculations to be displayed on a numerical display register mounted thereon.

Figure 4:
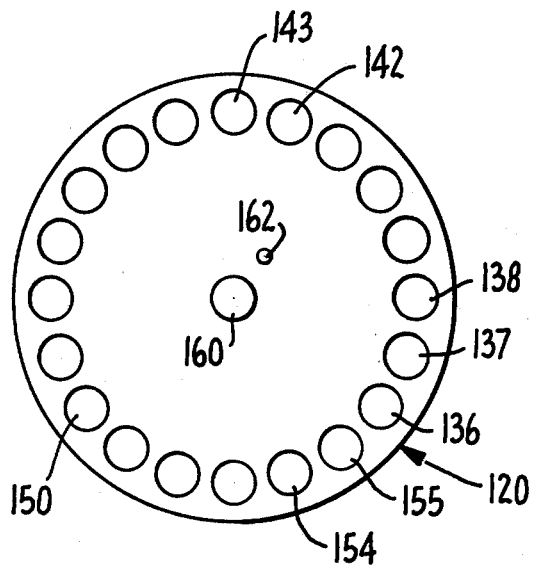
FIG. 4 illustrates the film discs used in the preferred embodiment of the present invention and the location of the exposure areas thereon.

Referring now to FIG. 3, there is shown the film drive 60 of the preferred embodiment of the present invention, on which is mounted a disc of photographic film 120, the preferred recording medium of the present invention. Also shown in FIG. 3 is the optical system of the preferred embodiment of the present invention. A plan view of film disc 120 is shown in FIG. 4.

The optical system of the preferred embodiment of the present invention comprises a plane mirror 126 which is selectively positionable either in the position 126 shown in solid lines in FIG. 3 or in the position 126' shown in dashed lines in FIG. 3. In both positions 126, 126' the lower surface of mirror 126, i.e., the surface facing photographic film disc 120, is the mirror surface or reflective surface.

A suitable lens 130 is fixedly mounted between mirror 126 and film disc 120 for the purpose of projecting an image of the face of monitor display tube 132 onto the upper surface of film disc 120.

In accordance with a particular feature of the present invention, substantially the entire useful display surface of monitor display tube 132 is imaged onto film disc 120, whereby to achieve considerably greater recorded image resolution than is the case with the images recorded from a prior art parallel linear array of multiple images on a single monitor display tube face. It is noted that all of the known prior art proposals for photographically recording phase images of the operation of an internal body organ employs such prior art parallel linear phase image arrays on a single monitor screen and thus are not capable of achieving the high recorded image resolution attained by the present invention, wherein a full screen image is projected onto each recording area of the recording medium.

Display tube 132 is the display tube of scintillation camera monitor 94 shown in FIG. 2.

Referring now to FIG. 4, and comparing it with the showing of film disc 120 and the optical system of the preferred embodiment in FIG. 3, it will be seen by those having ordinary skill in the art that mirror 126 and lens 130 serve to project the abovesaid full screen image of the display screen on monitor display tube 132 onto one at a time of a series of 20 image recording areas 136 through 155. It is to be understood that film disc 120 is not necessarily marked in its undeveloped state with circles indicating the position and size of each image recording area 136 through 155. It will also be seen in FIG. 4 that film disc 120 is provided with a center hole 160. Center hole 160 is of such size as to close-fittingly embrace the shaft of the film drive servomotor. It will further be seen in FIG. 4 that film disc 120 is provided with an indexing hold 162, which is adapted to close-fittingly receive an indexing pin. This indexing pin is a part of the film holding means shown in FIG. 3 and described in detail hereinafter. It is to be understood that the use of several such indexing pins and corresponding indexing holes in film disc 120 falls within the scope of the present invention.

As will now be understood by those having ordinary skill in the art, informed by the present disclosure, the purpose of film drive 60 (FIG. 3) is to rotate film disc 120 step-by-step between 20 stationary or standing positions, and to register the center of one of the image recording areas 136 through 155 with the optical axis of lens 130 while film disc 120 is in each standing position. Said standing positions will be individually referred to hereinafter by the respective reference designations P136 through P155, it being understood that when film disc 120 is in standing position P136 image recording area 136 is in registration with the optical axis of lens 130, when film disc 120 is in standing position P137 image recording area 137 is in registration with the optical axis of lens 130, etc.

Returning to FIG. 3, it is shown that the optical system of the preferred embodiment also comprises a projector lamp 166, a second lens 168, and a ground glass viewing screen 170.

In accordance with a particular feature of the present invention a developed photographic film disc bearing 20 sequentially arranged images of successive stages or phases of the operation of an internal body organ, which images were earlier exposed by means of the device of the preferred embodiment, may be put in the place of film disc 20 as shown in FIG. 3, and a synthesized motion picture of the operation of that internal body organ may then be projected on ground glass viewing screen 170 with the aid of projection lamp 166, lenses 168 and 130, and mirror 126, (repositioned to its 126' position). In so projecting a synthesized internal body organ motion picture on viewing screen 170 the developed film disc will, of course, be rotated step-by-step by film drive 60. When so projecting a synthesized organ motion picture from a developed film disc a separate, variable-rate pulse generator 172 (FIG. 3) may be used to produce step command signals for advancing film drive 160 at an operator-selectable uniform rate. The provision of such a variable-rate pulse generator is, of course, well within the scope of one having ordinary skill in the art.

It is also contemplated as part of the present invention that sufficient fan cooling be provided to carry away the heat of projection lamp 166 so that a developed film disc may be halted for viewing any selected image thereon on viewing screen 170. For this purpose projection step command signal generator 172 may be provided with a suitable manual "inching" circuit controlled by pushbutton 174, whereby the user may "inch" the developed film disc forward step-by-step until a desired image is presented on viewing screen 170, and then may consider that particular phase, as projected on viewing screen 170, for as long as desired.

It is further contemplated as part of the present invention that a greater number of recorded images may be provided on a film disc of fixed diameter by arranging the recorded images in a spiral pattern.

It is yet further contemplated as part of the present invention that separate projector means for projecting the images on the developed film disc onto a suitable viewing screen, either still or as a motion picture, may be provided.

Referring again to FIG. 3, it will be seen that film disc 120 is disposed on a film support 178. Film support 178 is itself symmetrical about the axis of a shaft 180, and is provided with a central bore 182 which close-fittingly embraces shaft 180. Film support 178 is affixed to shaft 180 by suitable fastening means of well-known kind (not shown). Film support 178 provides a flat, smooth upper surface 184 on which film disc 120 is disposed during the making of a synthesized internal body organ motion picture in accordance with the principles of the present invention. An indexing pin 186 is affixed in a suitable bore in film support 178 and projects upwardly through upper surface 184.

When film disc 120 is mounted for exposure in the device of the preferred embodiment, shaft 180 is passed through central hole 160 (FIG. 4) and indexing pin 168 is passed through indexing hole 162 (FIG. 4). After thus placing film disc 120 on film support 178 with shaft 180 and pin 186 passing through their corresponding holes therein a film retainer 188 is dropped onto film disc 120. Film retainer 188, like film support 178, is symmetrical about the axis of shaft 180, and is provided with suitable bores to close-fittingly receive shaft 180 and indexing pin 186. In general, the weight of film retainer 188 is sufficient to maintain film disc 120 in close contact with the upper surface 184 of film support 178. Fastening means for fastening film retainer 188 to shaft 180 may, however, be provided by those having ordinary skill in the art if found desirable.

As will also be evident from FIG. 3, shaft 180 is the shaft or an extension of the shaft of a servomotor 194. Servomotor 194 is preferably a hollow rotor, low mass, low inertia direct current servomotor.

Shaft 180 also projects downwardly from servomotor 194 (as seen In FIG. 3). A tachometer 196 is mounted on the end of shaft 180 opposite film support 178.

Angular position encoder disc 200 is mounted on shaft 180, as by means of a suitable locking collar 202.

Film support 178, encoder disc 200 and the rotor of tachometer 196 are all irrotatably affixed to shaft 180, i.e., affixed thereto for conjoint rotation therewith, and so as to be incapable of rotating with respect thereto.

A photoelectric disc reader 204 is so positioned with respect to encoder disc 200 as to be capable of reading therefrom a pair of 90°-staggered sinusoidal signals which vary in accordance with angular movement of shaft 180 about its own axis. Said two sinusoidal signals are separately electrically manifested on interconnections 206 and 208, respectively.

As also seen in FIG. 3, the two sinusoidal signals on interconnections 208 and 208 are supplied to a pulse shaper and quadrature detector 210. Pulse shaper and quadrature detector 210 operates in the well-known manner to transform the sinusoidal quadrature signals on interconnections 206 and 208 into a pair of rectangular wave signals on interconnections 212 and 214. The transitions of the rectangular wave signal on interconnection 212 indicate increments of rotation of shaft 180, whereas the transitions of the rectangular wave signal on interconnection 214 indicate changes in the direction of rotation of shaft 180. The signals on interconnections 212 and 214 jointly serve to augment or diminish the count stored in a position register, or position error register, 216 which is an eight-bit binary up/down counter.

Position register 216 is provided with step command signals by step command interconnection 90 (FIG. 2). Position register 216 is reset to its $255_{10}$ state each time a step command is received by it from step command signal interconnection 90. Position register 216 at all times provides an eight-bit binary digital indication of its present state on interconnection lines 220 through 227.

Read only memory (ROM) 230, which receives the eight-bit binary digital signal carried by interconnection lines 220 through 227, is programmed to provide on interconnection lines 234 through 241 and eight-bit binary velocity profile signal which when converted to analog form and amplified to drive servomotor 194 causes shaft 180 and thus disc 120 to be driven from one standing position to the next in minimum time consistent with the practical limits of the system. The particular velocity profile information stored in ROM 230 is shown in FIG. 5, expressed in terms of the magnitude of the analog signal on interconnection line 242, which is the output terminal of a digital-to-analog converter 244, plotted against the corresponding digital input signal to ROM 230 carried by interconnection lines 220 through 227.

As will now be evident to those having ordinary skill in the art informed by the present disclosure, the analog output signal on interconnection line 242 is applied to the input terminal of operational amplifier 246 and the output signal of operational amplifier 246 is applied to the input terminal of power amplifier 250, which itself provides driving current to servomotor 194 via interconnection line 252. In the preferred embodiment power amplifier 250 is a 200 watt integrated circuit and discrete component amplifier.

The output signal from tachometer 196 is supplied to the input of operational amplifier 246 via interconnection line 256 and potentiometer 258.

Figure 5:
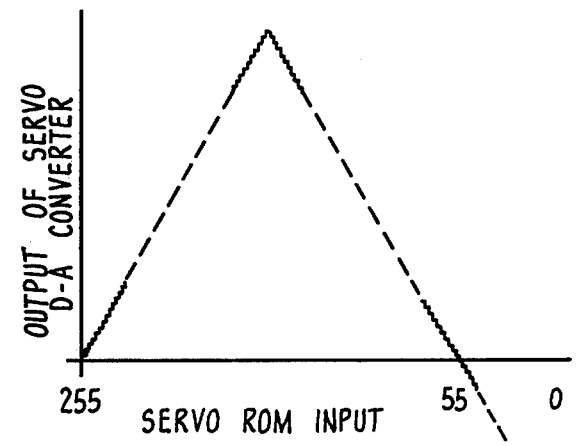
FIG. 5 is a schematic representation of the velocity profile voltages produced by the read only memory (ROM) and digital-to-analog (D-A) converter of the film servodrive of FIG. 3.

It will be seen from the above by those having ordinary skill in the art that FIG. 3 shows a digital rate-and-position servo of well-known type which serves to rotate disc 120 through 120° from one standing position to the next in the minimum time consistent with the maximum acceleration limits of the system whenever a step command signal on interconnection line 90 resets position register 216 to its $255_{10}$ count state, the new standing position of disc 120 being reached when the count in position register 216 returns to $55_{10}$, as seen from FIG. 5.

As will be evident to those having ordinary skill in the art, potentiometer 260 can be used to vary the power gain of the feedback loop and potentiometer 258 can be used to vary the amount of damping provided by the signal produced by tachometer 196.

In addition to the just-described feedback loop, the circuit of FIG. 3 also comprises a "disc standing" signal generator, which may be one of the commercially available devices known under the tradename ANALOK. "Disc standing" signal generator 264 provides a particular signal on interconnection 266 and a corresponding signal on interconnection 268 only when the binary digital signal on interconnection lines 220 through 227 indicates that position register 216 is in its $55_{10}$ state, and thus that disc 120 is at one of its standing positions.

The use of the signal on interconnection line 266 in connection with scintillation camera monitor beam control gate 96 has been described hereinabove. The "disc standing" signal on interconnection line 268 operates a solid state switch 270 to disconnect the input terminal 244 of operational amplifier 246 from the output line 242 of digital-to-analog converter 244 and immediately connect it to signal interconnection line 208, which carries one of the sinusoidal output signals from disc reader 204, via potentiometer 272. As will be evident to those having ordinary skill in the art, this sinusoidal output signal provides a "continuous ramp" signal which passes through zero voltage level and has both positive and negative voltage limbs, and which derives servo-motor 194, via operational amplifier 246 and power amplifier 250, to maintain disc 220 at or near its standing position until the next step command occurs on interconnection 90, when solid-state switch 270 reconnects input terminal 244 of operational amplifier 246 to output terminal 242 of digital-to-analog converter 244.

Referring now to FIG. 6, there is shown a block diagram of autoscaling amplifier 62 (FIG. 2). Autoscaling amplifier 62 comprises a type 1496 integrated circuit voltage-controlled amplifier 280 which receives the ECG signal from the associated ECG monitor (not shown) via interconnection 64. The gain of voltage-controlled amplifier 280 is controlled by a gain control signal on analog interconnection 282. This analog gain control signal is supplied from the output terminal 284 of a digital-to-analog converter 286 via interconnections 282 and 288 and amplifier 290. The input signal to digital-to-analog converter 286 is supplied from the output terminals of an eight-bit binary storage register 292. Storage register 292 is of a type well-known to those having ordinary skill in the art, the information contents of which can be changed only by the receipt of a suitable loading signal.

As shown in FIG. 6, register 292 is connected to multiple-conductor interconnection 82 (FIG. 2) and receives therefrom both its eight-bit binary digital input information and its loading signals.

As also shown in FIG. 6, the differential output signals from voltage-controlled amplifier 280 are applied through a manually adjustable balancing or offset adjustment network 293 to amplifiers 294 and 296 in cascade, amplifiers 294 and 296 being integrated circuit operational amplifiers of well-known type.

As will be apparent to those having ordinary skill in the art the contour or wave shape of the signal on analog interconnection 298 will be essentially the same as the contour or wave shape derived by multiplying each instantaneous amplitude of the ECG signal on interconnection 64 by a constant factor, the magnitude of this constant factor being dependent upon the setting of the potentiometer of balancing or offset adjustment network 293 and the magnitude of the eight-bit binary number stored in register 292.

Returning to FIG. 6, it will be seen that autoscaling amplifier 262 also comprises a second digital-to-analog converter 300, and a second eight-bit binary storage register 304. Digital-to-analog converter 300 is substantially identical to digital-to-analog converter 286. Storage register 304 is substantially identical to storage register 292. Register 304, like register 292, derives its eight-bit binary digital input signals from the multi-conductor interconnection 82 of FIG. 2. Register 304 also receives its loading signals by way of a conductor of feedback interconnection 82. The eight-bit binary digital input signals to digital-to-analog converter 300 are supplied from the output terminals of storage register 304, as the eight-bit binary digital input signals of digital-to-analog converter 286 are received from the output terminals of register 292.

As also shown in FIG. 6, the analog output signal of digital-to-analog converter 300 is applied to the lower input terminal 310 of operational amplifier 296 by means of amplifier 306 and analog interconnections 308 and 312.

As will be evident to those having ordinary skill in the art, informed by the present disclosure, the contour or wave shape of the signal on output terminal 78 of operational amplifier 296 will be substantially the same as the contour or wave shape derived by multiplying each instantaneous amplitude of the signal on interconnection 298 by a constant, but the offset or bias level of the signal on analog terminal 78 will differ from the offset or bias level of the signal on interconnection 298 by an amount determined by the magnitude of the voltage level on input terminal 310 of operational amplifier 296, supplied by storage register 304, digital-to-analog converter 300, and operational amplifier 306. It will further be seen by those having ordinary skill in the art that the magnitude of the offset of the signal on interconnection 78 as compared with the magnitude of the offset of the signal supplied by interconnection 298 will vary in accordance with the magnitude of the eight-bit binary number stored in register 304.

Considering autoscaling amplifier 62 as a whole, then, it will be seen by those having ordinary skill in the art that the overall gain thereof, between input terminal 64 and output terminal 78, is determined by the magnitude of the eight-bit binary number stored in register 292, and the difference in offset or bias level between the input signal on interconnection 64 and the output signal on interconnection 78 is determined by the magnitude of the eight-bit binary number stored in register 304.

PROGRAMMED FUNCTIONS OF THE PREFERRED EMBODIMENT

The first novel function performed by the internal body organ motion picture synthesizing apparatus of the preferred embodiment under the control of microprocessor 80 operating in accordance with sub-programs stored in ROM 86 is the digitization and normalization of the incoming ECG signal on input interconnection 64 (FIG. 2).

As discussed hereinabove, and indicated in FIG. 2, the analog output signal of autoscaling amplifier 62 is continuously converted by analog-to-digital converter 74 to digital form, and supplied to microprocessor 80 in digital form via multiconductor interconnection 76.

Microprocessor 80, under the control of instructions stored in ROM 86, samples the input signals on multiconductor interconnection 76 at a rate of 500 Hertz, and stores the current sample and a plurality of preceding samples in predetermined storage locations in RAM 88. In some sub-programs, each such sample storage location is paired with a sample time storage location. Thus, each sample time storage location corresponding to an occupied sample storage location contains a binary digital number indicative of the sampling time at which the sample in its corresponding sample storage location was taken.

Assuming the internal organ motion picture synthesizing apparatus of the preferred embodiment to be connected to an ECG monitor (not shown) and the electrocardiograph signal pickup electrodes of the ECG monitor to have just been applied to the patient, the automatic normalization function of the device of the preferred embodiment will now be described.

Microprocessor 80 responds to the presence of a sample in one or more of its sample storage locations, which were just previously unoccupied, by inserting into register 292 (FIG. 6) when its next loading signal occurs a low number which causes the gain of voltage-controlled amplifier 280 to drop to a very low value.

Microprocessor 80 then inserts into register 304 (FIG. 6) a predetermined sequence of test numbers, each corresponding to a different offset of the analog output signal on interconnection 78. The microprocessor tests each resulting signal sample to determine whether it falls within a predetermined medium to low magnitude range, e.g., $88_{10}$ through $138_{10}$ out of a total range of $000_{10}$ through $255_{10}$, and terminates this magnitude sampling process when all samples have fallen within this range for five seconds, i.e., 2500 samples.

Microprocessor 80, under the control of a subprogram stored in ROM 86, then proceeds to sequentially insert into register 292 (FIG. 6) a predetermined series of numbers, each corresponding to a particular value of gain in voltage-controlled amplifier 280.

At the same time, microprocessor 80 tests each sample until either (1) three seconds pass during which the maximum sample stored lies between $222_{10}$ and $242_{10}$ or (2) thirty seconds pass without criterion (1) being satisfied.

If criterion (1) is not satisfied within thirty seconds, a warning light is displayed on panel 104 (FIG. 2) indicating to the operator of the device of the preferred embodiment that the input ECG signal is not of sufficient quality to be normalized.

When this insufficient ECG signal quality warning light is illuminated, the operator immediately repositions the electrocardiograph signal pickup electrodes, thus causing microprocessor 80 to recommence the normalization sub-program as just described.

After an ECG wave of sufficient quality is established and normalized, microprocessor 80 carries out a subprogram seeking waves of maximum slope which are tentatively identified as R-waves by cross-comparison of eight stored samples.

When the maximum leading edge slope has thus been determined, and stored in a suitable storage location in RAM 88, microprocessor 80 tests each tentatively identified R-wave for a period of 15 to 20 seconds, and "accepts" the tentatively identified R-waves as authentic if each tentatively identified R-wave occurring during the 15 to 20 second interval, when tested for maximum slope as described above, has a slope greater than one-half of said maximum slope.

In certain modes of operation of the device of the preferred embodiment, determined by the setting of a mode switch on panel 104, microprocessor 80 then proceeds to carry out a subprogram of testing for the presence and accuracy of T-waves.

In the motion picture synthesizer of the preferred embodiment, in a selected mode of operation, a T-wave test commences 60 milliseconds after the detection of an R-wave peak.

In carrying out the T-wave test microprocessor 80 constantly maintains in a suitable storage location in RAM 88, and constantly updates, the sum of the eight previous samples. Further, microprocessor 80 maintains in a second storage location in RAM 88, and constantly updates, the clock time, from clock 84, of the taking of the last of the eight samples thus summed.

In accordance with this T-wave detection and testing sub-program, microprocessor 80, at the time of receiving each sample, compares the present (updated) sum, i.e., the sum of the just-received sample and the seven immediately previously received samples, with the previously stored sum of eight samples. If the comparison of the newly updated sum of eight samples with the previously stored sum of eight samples shows that the newly updated sum of eight samples is greater than the previously stored sum of eight samples, then microprocessor 80 continues to carry out this sub-program without interruption.

If, on the other hand, the test discloses that the newly updated sum of samples is greater in magnitude than the previously stored sum of eight samples, then microprocessor 80 operates to insert into the eight sample sum storage location the newly updated eight sample sum, and to insert into a corresponding storage location in RAM 88 the time of occurrence of the sample which resulted in the storage of the new eight sample sum value.

Microprocessor 80 continues to carry out this subprogram until the expiration of, e.g., a 350 millisecond interval following the peak time of the immediately preceding R-wave. At this time microprocessor 80 operates to transfer the most recently stored sample sum into an R-T interval duration storage location in RAM 88.

As a further check on the accuracy of the just-determined R-T interval duration, microprocessor 80 tests the newly stored R-T interval duration value to determine whether it falls within twenty milliseconds of the previously stored R-T interval duration value. If it does not do so, microprocessor 80 operates to replace the newly stored R-T interval duration value with the previously stored R-T interval duration value.

In the preferred embodiment of the present invention microprocessor 80 also serves to take an average of the eight previously stored R-R interval values, and to store the successively updated average R-R interval values in an average R-R interval duration storage location in RAM 88. Microprocessor 80 also serves to take an average of the eight most recent R-T internal duration values, and to continually store updated R-T interval duration value in an R-T interval duration value storage location in RAM 88.

In the preferred embodiment of the present invention a mode selection switch is provided on panel 104 whereby the operator may select to employ one of three frame interval (FI) values, i.e., a constant value which is invariant with ECG signal parameters (mode R-K), a value determined in accordance with the stored average R-R interval duration value (R-R mode), or a value determined in accordance with the stored R-T interval duration value (R-T mode).

In accordance with a further feature of the present invention, microprocessor 80 is programmed to test each newly stored R-R interval duration value to determine whether it falls between certain predetermined maximum and minimum limits. In the event that a newly stored R-R interval duration value falls outside said predetermined maximum limits, microprocessor 80 then commences a "PVC" subprogram whereunder no step command signals are produced on interconnection 90 until four R-waves are detected which fall within said limits and thus the photographic recording operation of the device of the preferred embodiment is terminated until the detection of said four R-waves. At the end of said predetermined interval microprocessor 80 functions to recommence the above-described normalizing operation, and the motion picture recording operation.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is further to be understood that while the use of the device of the preferred embodiment in synthesizing cardiac motion pictures from scintillation camera monitor signals is described in detail hereinabove, the present invention also has beneficial application in the production of synthesized motion pictures using X-rays or ultrasound, and in the production of synthesized motion pictures of organs other than a human heart, e.g., the motion of the liver during the respiratory cycle. Further, it is to be understood that while the employment of a disc of photographic film as described in preferred in accordance with the principles of the present invention, a closed loop of photographic film may also be employed in carrying out the present invention.

It is also to be understood that the following claims are intended to cover all of the generic and specific features of the invention herein described, and all statements of the scope of the invention which, as a matter of language, might be said to fall therebetween.

What is claimed is:

1. Internal body organ motion picture synthesizing apparatus, comprising:

film moving means for so intermittently moving a piece of photographic film as to serially present a plurality of areas thereof for exposure during a cycle of a cyclically functioning internal body organ; and synchronizing means for substantially synchronizing the presentation of each of said areas for exposure with the occurrence of a corresponding phase of successive cycles of said cyclically functioning internal body organ.

2. Internal body organ motion picture synthesizing apparatus as claimed in claim 1 in which said piece of photographic film is a disc of photographic film and said areas are distributed in seriatim concatenation about the axis of symmetry perpendicular to the plane of said disc.

3. Internal body organ motion picture synthesizing apparatus as claimed in claim 2 in which said internal body organ is a human heart and said synchronizing means comprises means for receiving an electrocardiograph signal.

4. Internal body organ motion picture synthesizing apparatus as claimed in claim 3, further comprising projecting means juxtaposed to said film moving means for projecting images of said areas onto a viewing screen when an exposed and developed one of said discs of photographic film is rotated about said axis by said film moving means.

5. Internal body organ motion picture synthesizing apparatus as claimed in claim 2, further comprising projecting means juxtaposed to said film moving means for projecting images of said areas onto a viewing screen when on exposed and developed one of said pieces of photographic film is moved by said film moving means.

6. Internal body organ motion picture synthesizing apparatus as claimed in claim 1 in which said piece of photographic film is a closed loop of photographic film and said areas are distributed therealong in seriatim concatenation.

7. Internal body organ motion picture synthesizing apparatus as claimed in claim 1 in which said internal body organ is a human heart and said synchronizing means comprises means for receiving an electrocardiograph signal.

8. Internal body organ motion picture synthesizing apparatus as claimed in claim 1, further comprising projecting means juxtaposed to said film moving means for projecting images of said areas onto a viewing screen when a developed one of said pieces of photographic film is moved by said film moving means.

* * * * *